United States Patent
Riley

[15] 3,689,164
[45] Sept. 5, 1972

[54] APPARATUS INCLUDING A MULTIPLE CONDUIT PATH SYSTEM FOR HANDLING LIQUIDS TO BE TESTED

[72] Inventor: Clifford Riley, Burgess Hill, England

[73] Assignee: Vickers Limited, London, England

[22] Filed: Dec. 22, 1970

[21] Appl. No.: 100,751

[30] Foreign Application Priority Data

Dec. 24, 1969    Great Britain..........62,948/69

[52] U.S. Cl..................................356/246, 250/218
[51] Int. Cl..........................G01n 1/10, G01n 21/26
[58] Field of Search......356/181, 184, 186, 244, 246; 73/53; 23/253; 250/218

[56] References Cited

UNITED STATES PATENTS

| | | |
|---|---|---|
| 2,983,184 | 5/1961 | Ferrari, Jr...................356/246 |
| 3,236,602 | 2/1966 | Isreeli.....................356/246 X |
| 3,241,432 | 3/1966 | Skeggs et al. ..........356/181 X |
| 3,477,403 | 11/1969 | Hartman..................23/253 X |
| 3,514,210 | 5/1970 | Hrdina.......................356/246 |
| 3,516,752 | 6/1970 | Hrdina.......................356/246 |
| 3,582,222 | 6/1971 | Hoblik.......................356/246 |

Primary Examiner—Ronald L. Wibert
Assistant Examiner—V. P. McGraw
Attorney—Pennie, Edmonds, Morton, Taylor & Adams

[57] ABSTRACT

Apparatus for testing samples of liquids comprising a test chamber and conduit or tube means providing fluid flow paths extending from the chamber, the fluid flow paths offerring different resistance to fluid flow whereby, with the conduit means or tubes providing flow paths connected to evacuation equipment and the chamber connected to a source of liquid, liquid is drawn into the chamber and into one path and thereafter gas is drawn out of the chamber through another path.

3 Claims, 1 Drawing Figure

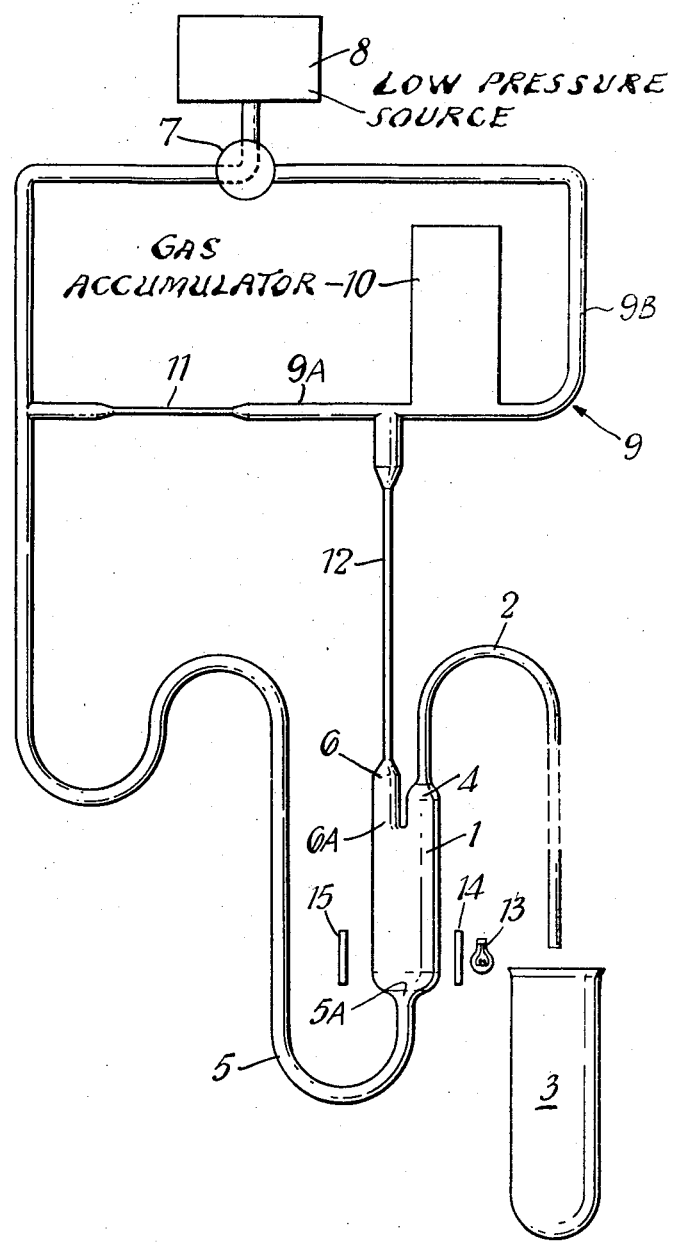

APPARATUS INCLUDING A MULTIPLE CONDUIT PATH SYSTEM FOR HANDLING LIQUIDS TO BE TESTED

This invention relates to apparatus for testing samples of liquids.

According to the present invention there is provided apparatus for testing samples of liquids comprising a test chamber having an inlet for liquids to be tested, a first outlet from the lower portion of the test chamber and below the inlet, and a second outlet above the desired liquid level in the chamber, an evacuating means, conduit means such as tubes providing first and second parallel fluid flow paths respectively from said first and second outlets to said evacuating means, the first fluid flow path including a portion located at a zone remote from said first outlet having a lower resistance to fluid flow than that offered by the second fluid flow path, said conduit means providing a third fluid flow path from said first outlet having a lower resistance to fluid flow than that offered by the second fluid flow path, said conduit means providing a third fluid flow path from said first outlet to said evacuating means bypassing said zone, means providing a supply source of liquid to be tested, means for conducting liquid from the supply source means to the test chamber inlet, means for connecting the conduit means of the first and second fluid flow paths to the evacuating means for drawing liquid into the test chamber and along the first fluid flow path until liquid reaches said zone and fills the test chamber to the desired level, while gas is drawn by the evacuating means from the test chamber through the conduit means providing the second fluid flow path, and means for connecting the conduit means of the third fluid flow path to the evacuating means for emptying the test chamber of liquid.

For a better understanding of the invention and to show how the same may be carried into effect, reference will now be made, by way of example, to the accompanying drawing, in which the single FIGURE is a schematic diagram of an apparatus for testing samples of liquids.

The apparatus shown in the FIGURE is for the photometric examination of solutions of body liquids. The apparatus includes a test chamber 1 from the top of which a probe 2 extends that can be inserted in a sample container 3. The portion of the chamber 1 at which the probe 2 communicates with the chamber 1 defines an inlet 4, the walls of which diverge outwardly from the end of the probe 2. First and second outlet tubes 5 and 6 extend, respectively, from a bottom outlet 5A and a top outlet 6A of the chamber 1.

A three-position valve 7, in a first position (shown in the FIGURE), connects the first outlet tube 5 to a low pressure source 8. Between the chamber 1 and the valve 7, the first tube 5 communicates with a portion 9A of a branch tube 9, the remaining portion 9B of the tube 9 being connected to the low pressure source 8 when the valve 7 is moved, through a second, closed position, to its third position. The second outlet tube 6 is connected to the branch tube 9 at the junction between the portions 9A and 9B. Between this connection and the valve 7 the tube 9 opens into a gas accumulator 10.

A first capillary 11 is interposed in the portion 9A of the branch tube 9, that is between its connections with the tubes 5 and 6, and accordingly at a zone remote from the chamber outlet 5A. A second capillary 12 is interposed in the tube 6. The first capillary 11 is considerably shorter in length than the second capillary 12 so that the tube 6 offers greater resistance to fluid flow than the tube portion 9A.

Photometric examination equipment in the form of a colorimeter including a lamp 13, filter 14 and photocell 15, is associated with the test chamber 1.

The apparatus is operated as follows. At the commencement of the operative cycle the valve 7 is set in its first position to connect the first outlet tube 5 to the low pressure source 8, bypassing the branch tube 9 and its capillary 11, so that air is drawn through the probe 2, chamber 1 and tube 5, this air tending to purge these components of moisture. The valve 7 is then moved to its second, closed position and the free end of the probe 2 is immersed in liquid in the sample container 3. This can be effected either by moving the container 3 vertically upwards or by moving the probe 2 vertically downwards. The valve 7 is now moved to its third position to connect the tubes 6 and 9 to the low pressure source 8 and cause liquid to be drawn through the probe 2 into the chamber 1. Since the resistance to fluid flow along the tube portion 9A is less than that to such flow along the tube 6, liquid drawn through the probe 2 and into the chamber 1 passes from the chamber 1 into the tube 5.

Due to the divergent form of the inlet 4, the liquid drawn into the chamber 1 is subjected to a pressure drop as it enters the chamber 1 and this tends to prevent frothing of the liquid and also tends to cause the liquid to flow down the wall of chamber 1 to the outlet tube 5, whereby the wall of the chamber 1 is rinsed.

The liquid continues to flow into the tube 5 until it reaches and enters the tube portion 9A. As the liquid reaches the capillary 11 the resistance to further flow of liquid along the tube portion 9A becomes greater than the resistance offered by the tube 6 to flow of gas and, accordingly, gas is drawn off from the chamber 1 via the tube 6 whilst the chamber 1 begins to fill with liquid. The tube 6 opens into the chamber 1, through the outlet 6A, above the level to which it is desired liquid should rise.

When the desired quantity of liquid has been drawn into the chamber 1, the valve 7 is closed, the colorimetric test effected, the probe 2 removed from the sample container 3, and the valve moved to its first position whereupon the chamber 1 is emptied of liquid via the tube 5 and the operative cycle can be re-commenced.

It will be appreciated that in place of the three-position valve 7 and evacuation equipment including the single low pressure source 8, evacuation equipment including two low pressure sources can be provided one connected through a valve to the first outlet tube 5 downstream of its connection with the branch tube 9 and the other connected through a valve to the branch tube 9 downstream of its connection with the tubes 5 and 6. One or both capilliaries 11, 12 can be replaced by any suitable alternative form of resistance to fluid flow.

In all cases the tube or conduit system as described provides first and second parallel fluid flow paths that can respectively serve to connect the outlets 5A and 6A with the low pressure source 8 (or one such source) are constituted respectively by (a) the tube 5 to its connection with the tube 9, and the portion 9A of the tube 9, and (b) the tube 6. In addition there is a third fluid flow path, constituted by the tube 5 in its entirety, that can serve to connect the outlet 5A with the source 8 (or another such source).

I claim:

1. Apparatus for testing samples of liquids comprising a test chamber having an inlet for liquids to be tested, a first outlet from the lower portion of the test chamber and below the inlet, and a second outlet above the desired liquid level in the chamber, an evacuating means, conduit means providing first and second parallel fluid flow paths respectively from said first and second outlets to said evacuating means, the first fluid flow path including a portion located at a zone remote from said first outlet having a lower resistance to fluid flow than that offered by the second fluid flow path, said conduit means providing a third fluid flow path from said first outlet to said evacuating means by passing said zone, means providing a supply source of liquid to be tested, means for conducting liquid from the supply source means to the test chamber inlet, means for connecting the conduit means of the first and second fluid flow paths to the evacuating means for drawing liquid into the test chamber and along the first fluid flow path until liquid reaches said zone and fills the test chamber to the desired level, while gas is drawn by the evacuating means from the test chamber through the conduit means providing the second fluid flow path, and means for connecting the conduit means of the third fluid flow path to the evacuating means.

2. Apparatus according to claim 1, including a first capillary interposed in the conduit means providing said first fluid flow path at said zone, and a second capillary interposed in the conduit means providing said second fluid flow path, the first capillary being considerably shorter in length than the second capillary whereby the first fluid flow path offers lower resistance to fluid flow than the second path.

3. Apparatus according to claim 2, wherein the conduit means comprises a first outlet tube extending from said first outlet to the evacuating means, a branch tube branched from the first outlet tube also extending to said evacuating means, and a second outlet tube extending from said second outlet to and connecting with said branch tube, said first capillary being interposed in the branch tube between its connections with the first and second outlet tubes and said second capillary being interposed in said second outlet tube, the first outlet tube to its connection with the branch tube, and the branch tube to its connection with the second outlet tube providing the first fluid flow path, the second outlet tube providing the second fluid flow path, and the first outlet tube in its entirety providing the third fluid flow path.

* * * * *